No. 615,984. Patented Dec. 13, 1898.
J. H. HARTING.
AUTOMATIC PNEUMATIC TURN TABLE.
(Application filed Feb. 14, 1898.)

(No Model.) 5 Sheets—Sheet 1.

Witnesses:
Wm. H. Payne.
B. E. Doll.

Inventor:
John H. Harting
By E. J. Silvius
Attorney.

No. 615,984. Patented Dec. 13, 1898.
J. H. HARTING.
AUTOMATIC PNEUMATIC TURN TABLE.
(Application filed Feb. 14, 1898.)
(No Model.) 5 Sheets—Sheet 2.

Witnesses:
Wm H Payne
B. E. Doll

Inventor:
John H. Harting
By E. T. Silvius
Attorney.

No. 615,984. Patented Dec. 13, 1898.
J. H. HARTING.
AUTOMATIC PNEUMATIC TURN TABLE.
(Application filed Feb. 14, 1898.)
(No Model.) 5 Sheets—Sheet 3.

Fig. 7.

Witnesses:
Wm H Payne
B. E. Doll

Inventor:
John H. Harting.
By E. T. Silvius
Attorney.

No. 615,984. Patented Dec. 13, 1898.
J. H. HARTING.
AUTOMATIC PNEUMATIC TURN TABLE.
(Application filed Feb. 14, 1898.)

(No Model.) 5 Sheets—Sheet 4.

Witnesses:
Wm H Payne
B. E. Doll.

Inventor:
John H. Harting.
By E. T. Silvius
Attorney.

THE NORRIS PETERS CO., PHOTO-LITHO., WASHINGTON, D. C.

UNITED STATES PATENT OFFICE.

JOHN H. HARTING, OF INDIANAPOLIS, INDIANA.

AUTOMATIC PNEUMATIC TURN-TABLE.

SPECIFICATION forming part of Letters Patent No. 615,984, dated December 13, 1898.

Application filed February 14, 1898. Serial No. 670,194. (No model.)

*To all whom it may concern:*

Be it known that I, JOHN H. HARTING, a citizen of the United States, residing at Indianapolis, in the county of Marion and State of Indiana, have invented certain new and useful Improvements in Automatic Pneumatic Turn-Tables; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to railway turn-tables and like structures which rotate upon a central pivot or axis, particularly to such as are adapted to operate for turning locomotives and cars at railway-shops where compressed air is usually supplied for general use or may be readily produced; and it consists in certain new and novel devices and means whereby turn-tables and shop-doors may be operated automatically by means of either compressed air or steam as the initial force supplied by a stationary plant independently of the turn-table and conveyed thereto and in means by which such force is employed to automatically control the various necessary mechanical movements in the operation of such turn-tables and doors; and it further consists in the parts and combination of parts embodied in the details of construction thereof, as will be more fully described hereinafter.

My objects are to provide inexpensive and durable means whereby the cost of handling and turning locomotives at such turn-tables is reduced to the minimum and liability to accident obviated by reason of the operation being controlled by one man alone, who may be responsible therefor, and these are fully attained in my invention.

Referring to the drawings.

In the drawings, A designates a turn-table, and D its supporting-center; C, the circular pit in which the table operates; E, the circular toothed rack anchored in the pit; F, the circular track for supporting the ends of the table; G, the end rollers of the table; B, the bulkhead around the pit; $a$, the fluid-reservoir; T, the main motor; U, the arch; V, the main valve; X, the main-valve controller; P P$^2$, the primary controlling-valves; W, the latch-release valve; W$^2$, the latch-applying valve; Y, the swivel-joint; R, the safety-valve; R$^2$, the safety-valve cylinder; I$^2$, the safety-clutch; Q, the auxiliary release-valve; A$^2$, the door-opening valve; A$^4$, the door-operating cylinder; A$^5$, the door-closing valve, and J$^2$ a whistle-valve for signaling.

In construction I employ any suitable design of turn-table, to which I apply my devices for its operation. In some types a central arch may be in use for other purposes and may be adapted for receiving and supporting my mechanism. Otherwise I secure foundation-beams U' transversely beneath the frame of the turn-table and upon which I erect a suitable arch U for supporting the swivel-joint and its connections. The arch is so constructed that while it furnishes proper support it is slightly flexible laterally to compensate for the tilting of the table without injury to the swivel-joint or its connections.

The toothed rack E is circular and extends around the pit, to the bottom of which it is suitably anchored, and it is of suitable diameter to adapt it to the length of the table or to the type of main motor employed. The gear-teeth may be either internal or external to adapt the rack to the positions of the gearwheels employed in connection with it. In the face of the bulkhead around the pit, at each track-approach, is a pocket 32 to receive the latch-bolt $w$, and at either side of each pocket a face-plate may be secured, against which the end of the latch-bolt may slide in approaching the pocket.

As a main motor I may employ any suitable type of fluid-pressure engine that may be situated upon the table, in which case the train of operating-gearing is designed accordingly; but I preferably employ that shown, in which T is a cylinder of suitable size, having a head at each end, provided with a packing-box through which the piston-rod S passes. In the cylinder is a packed piston $S^3$, attached to the rod S at its longitudinal center. The cylinder is rigidly secured to the turn-table frame, preferably at the outside, by suitable brackets T'. The end $T^2$ of the cylinder has a port-opening, to which is connected a port-pipe $h$, and the end $T^3$ has a like port and a connected pipe $g$, both pipes leading to and connecting with the main-valve chest. At each end of the piston-rod S is attached a cross-head S', which may have suitable rollers in contact with guide-bars $S^2$, which are suitably supported and keep the cross-heads and piston-rod in alinement. A cable or chain O has its ends connected to the cross-heads and runs over suitably-mounted wheels M and N, continuing between said wheels back of the cylinder, where it may be suitably supported upon rollers to prevent sagging. The wheel M imparts motion to the table by means of a suitable train of gearing connecting with the rack E, in the present case being secured to a vertical shaft, suitably supported, to which is secured a toothed wheel L, meshing with a smaller wheel K, secured to an intermediate vertical shaft, to which is also secured a larger toothed wheel J, this meshing with a smaller wheel I, secured operatively to a third vertical shaft, which is preferably mounted at the transverse center of the table and carries a larger toothed wheel H, engaging the rack E. The toothed wheel I is not permanently secured to its shaft 89, but drives its shaft by means of a clutch-block $I^2$, working over a feather 88, set into the shaft and engaging a suitable recess in the extended hub I' of the wheel. The recess and the exterior of the clutch-block may be of any suitable contour, as square or hexagonal, so that they interlock. When the block is disconnected, the wheel is free to rotate upon its axle-shaft, so that when the cross-head nearest the gearing is at either extremity of its travel the clutch-block will be automatically disengaged, permitting the table to move further by its momentum without damaging the machinery, as will be further described.

It will be understood that the table is designed to have but one complete revolution and a like reverse motion.

A reservoir $a$ of suitable capacity is conveniently located upon or at the side of the table and is connected by a pipe $d^3$ with the swivel-joint Y, the latter having a communicating pipe $b^3$, leading from any suitable air-compressing plant, by which the reservoir may be continuously supplied for the requirements of the main motor, the latter being supplied through a pipe $f$, leading from the reservoir to the chest of the main valve V and thence through the pipes $g$ or $h$. The pipes $b^4$ and $d^4$ are designed to supply steam for preventing the freezing of moisture due to condensation in the motor and pipes; but a plan of the course of the pipe $d^4$ is omitted in the drawings to avoid confusion. The pipes $b'$ and $b^2$ lead from a suitably-situated air-compressor, preferably passing all the storing-tracks in the roundhouse adjacent, at each of which is a primary controlling-valve P, and thence to the swivel-joint, the latter having communicating pipes $d'$ $d^2$ leading to the main-valve controller X, to which, when the handles of all the primary valves are in a normal position, a constant pressure of air is supplied and maintained by the compressor, the flow of air to the controller being independent in each pipe through suitable ducts in the primary valves, so that each pipe provides a continuous duct from one source and in which an equal pressure is maintained except when disturbed by manipulation of a primary valve.

Electric-circuit wires 4 and 5 may be employed in connection with a suitable battery 2 and circuit-breaker 6, by which signal or other lights may be operated upon the table or for other purposes, as desired.

Figure 1:
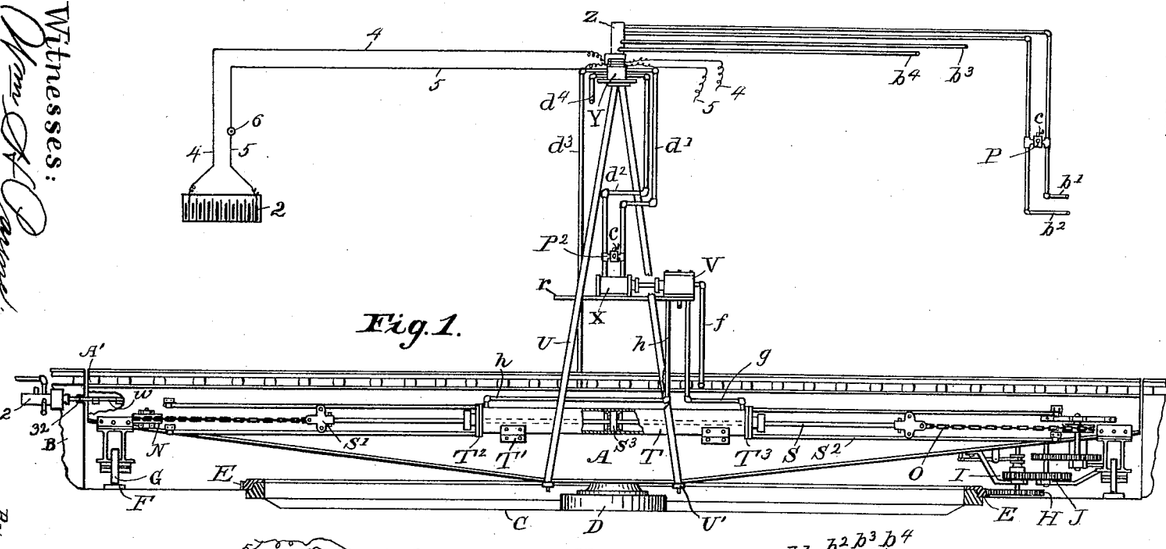
Figure 1 represents a side elevation, Fig. 2 a top plan, and Fig. 3 an end elevation, of a railway turn-table embodying my invention.
Figure 2:
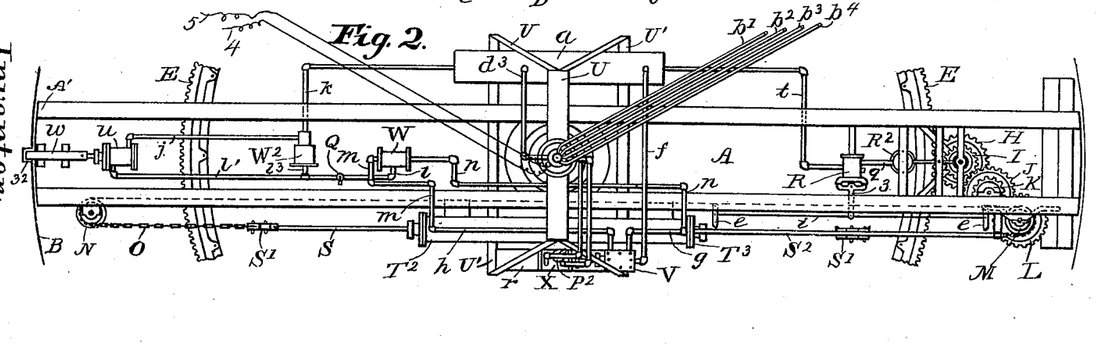
Figure 3:
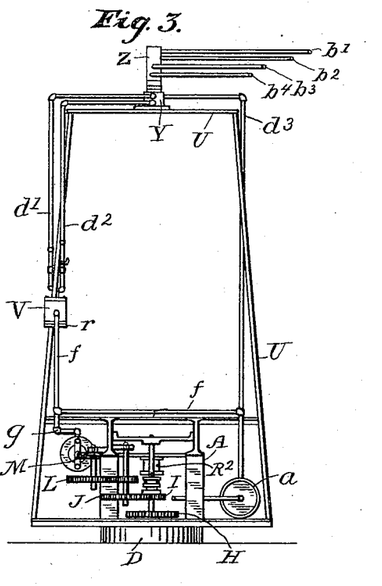
Figure 4:
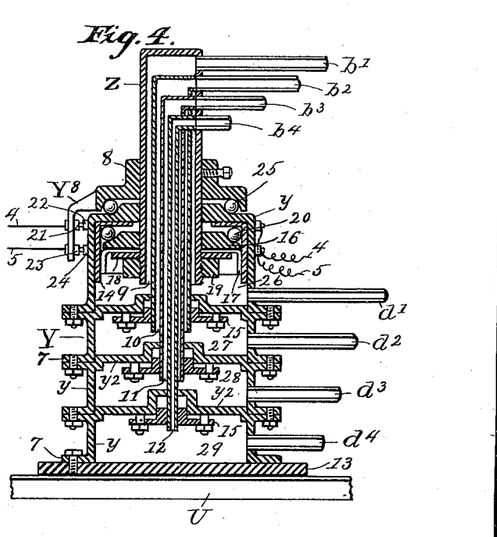
Fig. 4, a vertical central sectional view of my swivel-joint.

The swivel-joint Y is situated centrally above the turn-table and is suitably secured to the top of the arch U, so that its lower portion and connected pipes and wires rotate with the table, while its upper portion and connected pipes and wires remain stationary, so held by the pipes, which may be suitably anchored above the bulkhead or to adjacent buildings. It consists of a case $y$, divided by transverse partitions $y^2$, forming a suitable number of separate sections and chambers, the sections being connected by suitable means, as by flanges 7 and bolts, and the lower section secured to the base 13. Each partition has a suitable circular central opening or hole, around which is a packing-box and gland 15 therefor. Each chamber has an outlet-opening for the discharge of fluid, chamber 26 being connected by pipe $d'$, chamber 27 by pipe $d^2$, chamber 28 by pipe $d^3$, and chamber 29 by pipe $d^4$. The top and upper portions of the sides of chamber 26 are preferably lined by a bushing 14, of hard non-corrosive metal. The upper portion of the joint comprising the stationary parts of the swivel-joint consists of the case Z, having a number of pipes therethrough, which may be either cast therein integrally or be inserted from the bottom and secured into suitable sockets at the top. The inlet-pipes $b'$, $b^2$, $b^3$, and $b^4$ are suitably connected to the case, which, together with the pipes, form separate ducts, opening into the several chambers below, as shown. The lower end 9 of the case has exterior screw-threads, on which is a threaded nut 19, binding the washer 18 and packing 17 against the head 16, which is suitably secured to the case and has at its top a ball race or channel, in which are balls 20, providing an antifrictional bearing against the inside of the top of the case $y$ to resist the upward pressure of the fluid escaping into the several chambers. At the outside of the top of the case $y$ is a ball-race having bearing-balls 25, upon which is a collar 8, adjustably secured to the case Z, and having a ball-race in contact with the balls 25 to retain the weight of the stationary parts when no fluid-pressure exists. When it is desired to use electricity upon the turn-table, the collar 8 is provided with an overhanging arm $Y^3$, carrying insulated brushes 21 and 23, to which are suitably connected the wires 4 and 5, respectively. Around the case $y$ is suitably attached insulated magnetic rings 22 and 24, to which are attached the continuing circuit-wires leading to any suitable point upon the table, the brushes and rings forming an insulated circuit through the swivel-joint. The ends 10, 11, and 12 of the internal pipes pass through suitable packing in the partitions separating the several chambers mentioned. Thus it will be seen that as shown four separate ducts are provided through the swivel-joint, and any number required may be employed, the upper and lower portions being permitted to rotate relatively by reason of the packings, in which the several parts are free to rotate.

The main valve V may be of any suitable type, a preferable form being that having a case forming a valve-chest and reservoir, at the bottom of which is a plane seat, through which are oblong ports situated transversely and communicating with the pipes $g$ and $h$, a central exhaust-port $V^2$, leading to the atmosphere, and upon the seat a sliding D-valve V', covering the ports, the valve being operated by means of a suitably-attached stem $V^3$, having at its opposite end a packed piston 71, working in the cylinder of the main-valve controller X. This cylinder has preferably removable heads, each of which carries a cage 72, forming stops for the piston 71, so that the travel of the valve V' is limited to the proper opening of either outlet-port. Each head is also provided with adjusting-screws 75, passing through the head and against which is a ring 74, forming a seat for the spring 73, one of which is interposed between the ring and piston at each side, by the pressure of which the piston is held in a central position, so that the valve V' covers all the ports. Port-pipes $d^2$ and $d^3$ are connected to the cylinder, so that an equal pressure of fluid may be maintained at each side of the piston 71. A primary valve $P^2$ is placed at a convenient point, connecting the pipes $d^2$ and $d^3$, so as to be operated by the attendant upon the turn-table.

The latch $w$ consists of a bar having suitable stops 31 and sliding in guides 30, by which it is suitably supported at the end A' of the table opposite the gearing, the object being to distribute the weight of all the parts nearly equally upon the table, so as to balance. The outer end of the bar is adapted to enter the pockets 32, and the opposite end has a socket $w^2$, into which is keyed a piston-rod $w'$, passing through the head 34 of the latch-cylinder $u$, the head having a packing-box 35 and nut or gland 36. To the inner end of the rod is attached a piston 38, having followers 37 and cupped leather packings 33, the whole secured to the rod by a nut 39 and may be withdrawn for renewal of packing by removing the head 40. At one end of the cylinder is a pipe $l'$ and at the opposite end a pipe $j$ for the passage of fluid.

The release-valve W comprises a small cylinder 41, having like heads 47 and 48 at the ends, which may be either cast integrally or made separately and attached. The cylinder is preferably separable midway between the ends. Each head has at the inside, but cast integrally with the walls of the cylinder, a short cylinder open at the inner end, as 49 and 50, and a passage, as 60 or 61, leads therefrom to the atmosphere. Each of these small cylinders has a valve-seat 58 at the bottom around the pipe-opening corresponding to the valves 56 or 57, which are also constructed as packed pistons, filling the small cylinders and adapted to close the ports 59, 60, or 61. The piston 51 is packed and is adapted to close the port 42 and is connected by a suitable stem to the piston 56. The opposite side of piston 51 has a hollow stem 53, around which is a spiral spring 54, seated between the pistons 51 and 52, normally holding piston-valves 56 and 57 to their seats. Packed piston 52 is connected to piston 57 by a suitable stem and at the opposite side has preferably a stem 55, adapted to slip freely into the hollow stem 53, the end of the latter being a stop-gage against the opposite piston. Piston 52 is adapted to normally close port 43, which communicates with port 42, a branch 44 communicating with pipe $l$.

The auxiliary release-valve Q preferably consists of a small cylinder having at one end a central aperture 46, at the inside of which is a valve-seat and a cage adapted to guide the valve Q', which is secured to a stem, at the opposite end of which is a packed piston 45, secured thereto. A spiral spring $Q^2$ normally holds the piston against the opposite head of the cylinder and the valve off its seat, allowing a clear passage from pipe $l'$, connected to the cylinder, through the opening 46 to the atmosphere from cylinder $u$. At the opposite side of piston 45 the cylinder is in connection with pipe $l$.

The latch-applying valve $W^2$ consists of a cylinder having a larger diameter at one end and a smaller diameter at the opposite end, and the larger end is in communication with a branch pipe $l^3$, connecting with the latch-controlling valve W. Near the center of the smaller end the cylinder has an exhaust-port 70 and a port communicating with pipe $j$, leading to the cylinder $u$. In the larger end of the cylinder is a packed piston 63, having a stem 65, by which is carried a slide-valve 64, provided with a D exhaust-cavity covering the port 70 and adapted to cover the port leading to pipe $j$. The opposite end of the stem 65 carries a packed piston-valve 67, having a port 68 extending from the outer end into its center and out of its side to communicate with port 69, leading around it to the chamber 66 in the cylinder. The opposite or smaller end of the cylinder is in communication with pipe $k$, connected at its opposite end to the reservoir $a$.

The various valves not otherwise located may be situated at any convenient point upon the table or its frame.

The safety-valve R comprises a cylinder having a larger diameter at one end and a smaller diameter at the opposite end. In the smaller portion is a slide-valve 77, having an exhaust D-cavity covering an exhaust-port 79 and a port communicating with a pipe $q$. Above the valve is a pipe $t$, communicating between its cylinder and the reservoir $a$. The valve 77 is carried by a stem 78, at the end of which is secured a packed piston 76, working in the larger portion of the cylinder. This piston has a valve normally seated against the head 80 of the cylinder, in which is a suitable vent-hole. The opposite end of the stem 78 passes through the packed head of the cylinder and is pivotally connected to the lever 3, which has at each side an arm bearing against a bracket $R^3$, attached to the cylinder, forming a fulcrum. Lever 3 is connected by a rod $i$ to suitable levers $e$ $e$, pivoted at one end.

The safety-valve cylinder $R^2$ is of common construction, of iron, and is preferably provided with a bushing 83, of brass, through which the rod 84 freely works at one end, permitting a vent around the rod. The opposite end has a closed head 82, by which the cylinder is suitably supported. The opposite end of the rod is attached to a packed piston 81, working in the cylinder. The pipe $q$ communicates with the cylinder between the piston and the head 82. The outer end of the rod 84 is pivoted to a lever 86, which is pivoted to the fulcrum 85, suitably supported, the opposite end of the lever being in contact with the block $I^2$, engaging an exterior annular groove in the block. The block $I^2$ is normally in engagement with the hub $I'$ and may be designed to be so held by the force of its own weight; but in some cases it is desirable to augment this by a spring $I^3$, interposed between it and a bearing-washer 87, seated against the guide-brace of the shaft 89.

The primary valves may be of any suitable form providing ducts or passages through which fluid may pass in a separate current in each of the two connecting line-pipes and having an exhaust-port and so adapted that the exhaust may be opened to either line-pipe at one side of the valve, while the same pipe is closed at the other side of the valve. A suitable form is that of a plug-valve shown in Fig. 6, in which the plan of the ports is exposed.

In order to fully carry out my invention and dispense with the attendance of men to open and close the house-doors, I accomplish this by fluid-pressure also and by simple means. The pocket 32 at each house-track is open at the rear to admit the rod $A^3$ of the valve $A^2$, which protrudes somewhat into the pocket. This rod passes through a packing-box $E^8$ into and through the cylinder $E^2$ and through the smaller cylinder $E^6$, terminating in a guide-cap $E^7$ at the opposite end. A packed piston $E^3$ is secured in the cylinder to the rod $E^8$, and the latter carries a sliding D-valve $E^4$, working over an exhaust-port $E^5$, designed for slow exhaust, and an outlet-port to the connecting-pipe $B^2$. Around the bulkhead is a supply-pipe $D^2$, from which a branch $D^3$ supplies the valve $A^2$ and normally forces the piston $E^3$ and its rod outward.

Figure 11:
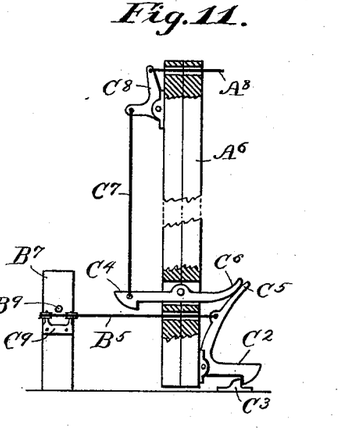
Fig. 11, a side elevation of a door, showing latches in detail.

A suitable cylinder $A^4$ is situated, preferably vertically, at a convenient point near each pair of doors and secured in a suitable manner. It has a packed piston $D^7$ secured to a rod $D^8$, which passes through both heads of the cylinder, suitably packed. The upper end of the rod connects cables $A^8$ and $A^9$, which run over guide-pulleys and are adapted to lead to the top of the doors $A^6$ and $A^7$, respectively, and to unlatch and close them when the piston $D^7$ moves downward. The opposite end of the rod connects cables $B^4 B^6$ and branch $B^5$, which run over suitable guide-pulleys and are adapted to connect the doors at the bottom and unlatch and open them when the piston moves upward. The latches are shown only in the exaggerated view in Fig. 11. At the inside of the door, near the bottom, is a bell-crank hooked latch $C^2$ engaging a catch $C^3$, secured to the house-floor, its upper arm $C^5$ being curved outward from the door $A^6$, and is connected to the end of the cable $B^5$, which passes around two sides of the post $B^7$, over guide-pulleys mounted on a bracket $C^9$, and through an aperture in the door. Above this cable is pivoted a hooked latch $C^4$, having its inner end $C^6$ curved upward and in contact with the arm $C^5$, while its outer end is connected to the lower end of the cable or rod $C^7$. At the outside of the top of the door is a bell-crank $C^8$, having one arm connected to the cable $C^7$ and its other arm connected to the end of the cable $A^8$, which passes through an aperture in the door. A pin $B^9$ affords a catch at one side of the post $B^7$ for the latch $C^4$. Fluid for forcing the piston $D^7$ enters the cylinder $A^4$ either through the pipe $B^2$ or the pipe $D^6$.

The door-closing valve $A^5$ comprises a cylinder of preferably three diameters $F^2$ $F^3$ $F^4$, in the first of which is a packed piston $F^5$, secured to a rod $F^7$, in the second a packed piston $F^6$, secured also to the same rod, and in the third a D-valve $F^8$, carried by the opposite end of the rod $F^7$. The valve works over an exhaust-port $F^9$ and a port leading to pipe $D^6$. The head $G^9$ is provided with a valve $G^2$, communicating through a branch pipe $D^4$ with the pipe $B^2$. The valve is suitably designed, either a disk or piston type being adaptable, and is normally held slightly open by means of a suitable spring of slight tension, so that fluid from below may further open it and freely pass through, and when the fluid is gradually removed from below the fluid above may also pass through the valve from the cylinder $F^2$, but the valve will close and so remain when the full volume and pressure of fluid is suddenly applied above it and no pressure exists below it. The head $G^9$ is also provided with a similar but preferably larger check-valve $G^3$, and preferably held normally to its seat by a suitable spring, and is in communication through a pipe $D^5$ with the lower end of the cylinder $A^4$ at a distance from its head exceeding the thickness of the piston $D^7$. The smaller cylinder $F^4$ is supplied by fluid under pressure through a pipe $B^3$, communicating with a main plant and equal to the pressure in the pipe $D^2$, communicating with the same plant as a steam-boiler or air-compressor. Leading from the cylinder $F^4$ is a port $G^7$, communicating with a cylindrical chamber, in which is seated a valve $G^4$, held to its seat by a suitable spring and attached to a stem, near the lower end of which is secured a packed piston $G^5$, working in a cylinder below the valve-seat, and from which cylinder, above the piston, a port $G^6$ communicates with the bottom of the cylinder $F^2$ at the head. Below the piston $G^5$ its stem extends, when the valve $G^4$ is seated, slightly into the larger cylinder $F^2$, so that the stem is pushed upward to unseat valve $G^4$ by contact with the piston $F^5$, as shown, when the latter is at its upward limit of movement.

The signaling-valve $J^2$ may be constructed similarly to that of valve $A^2$, except that neither the exhaust-port nor the exhaust-cavity in the valve is required. The cylinder is constantly charged from the pipe $D^2$. The valve-stem $J^5$ protrudes and the end is covered by the spring-slide $J^6$, which is pushed inward by contact with the roller-trip $J^7$ at the corner of the table as it passes, thus opening a valve and admitting a puff of fluid into the pipe $J^4$ and to a suitable whistle $J^3$, giving an alarm or signal.

It is obvious that many minor modifications may be made in the details of construction within the scope of my invention, as I do not limit myself to the exact forms shown herein so long as the several parts perform in the best manner the specified functions.

Where electricity is not required, this feature might be omitted, and in lieu of the swivel-joint described I might employ a plurality of flexible hose having the lower ends connected to pipes upon the table and the opposite ends connected to suspended pipes above.

Suitable springs may be applied to the various valves to prevent accidental movement when not under fluid-pressure.

Figures 5, 6:
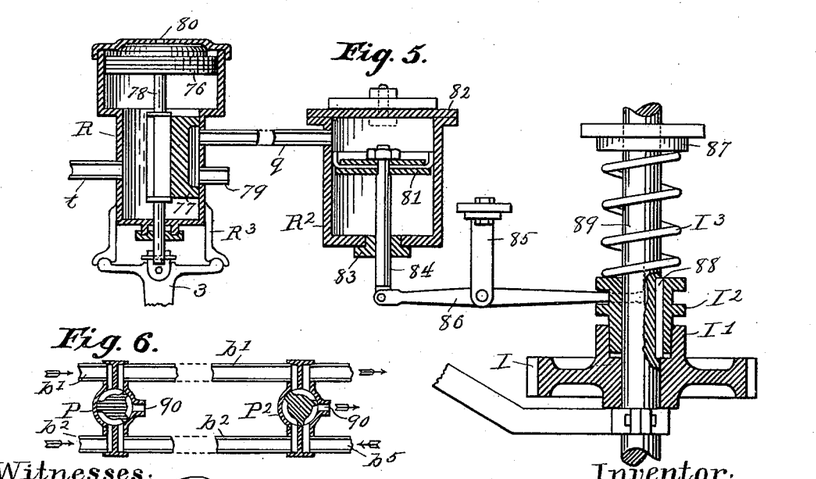
Fig. 5, sectional details of parts and arrangement of automatic safety devices.
Fig. 6, a plan in section of primary controlling-valves.
Figure 7:
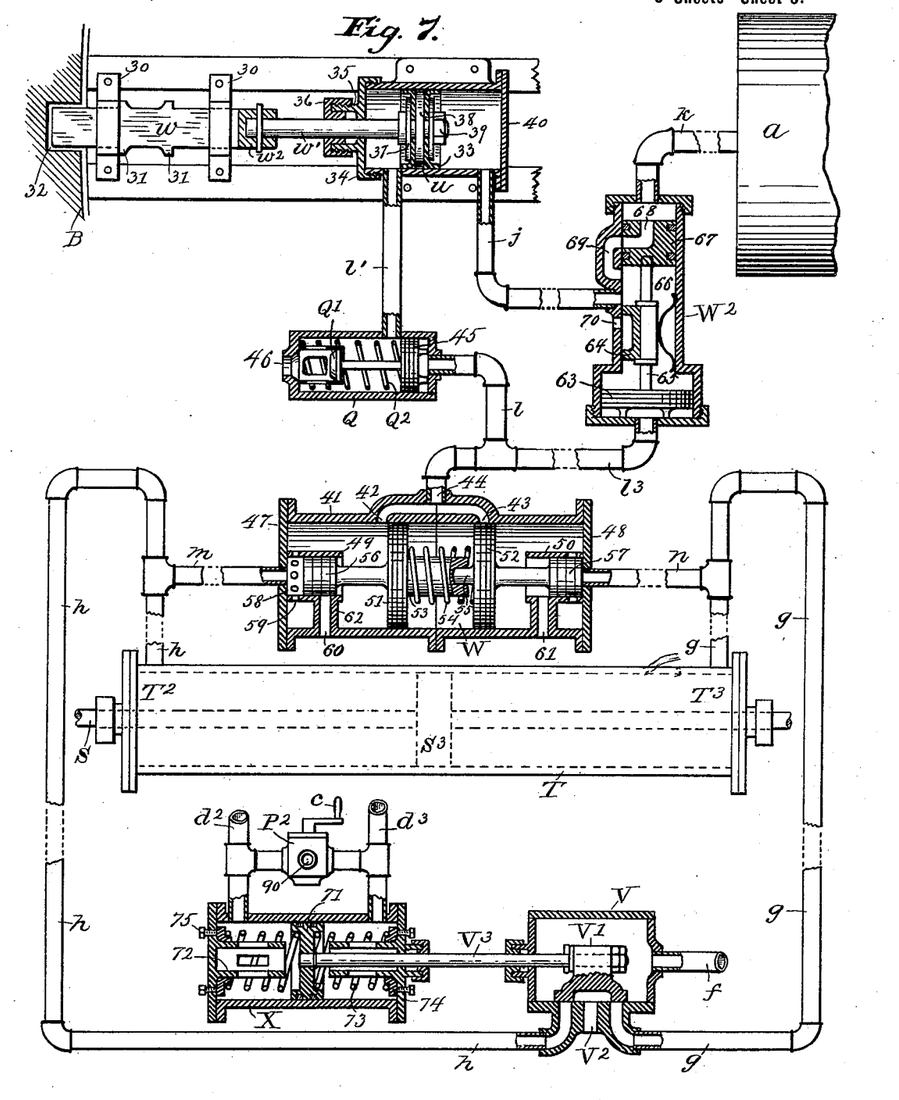
Fig. 7, central sectional views of details of parts and showing relative operative positions of the automatically-controlled valves and mechanism.
Figure 8:
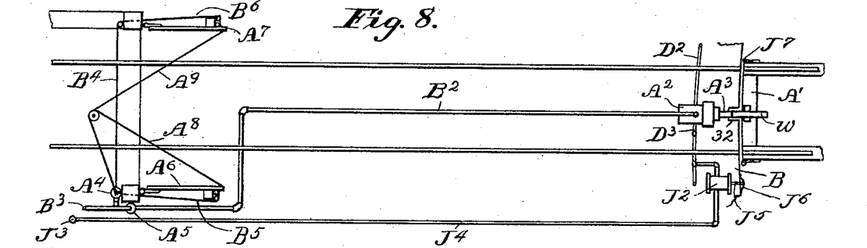
Fig. 8, a plan view of tracks leading from the turn-table to the entrance to roundhouse.
Figure 9:
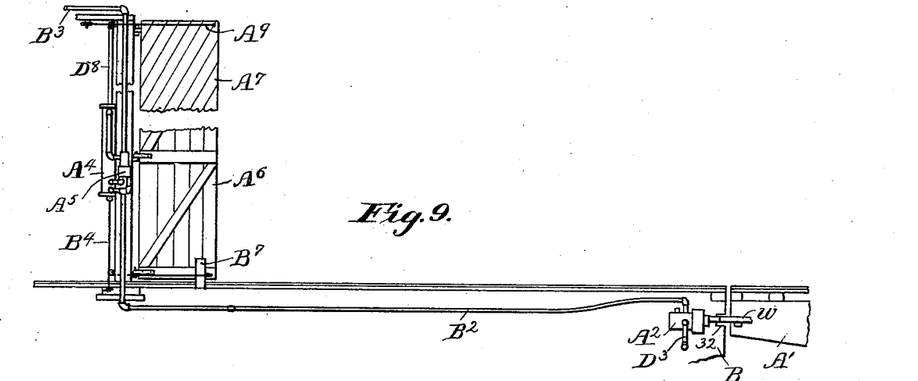
Fig. 9, a side elevation of Fig. 8.
Figure 10:
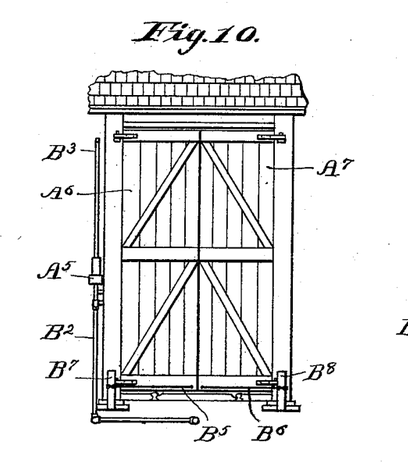
Fig. 10, a front view of a pair of roundhouse-doors.
Figure 12:
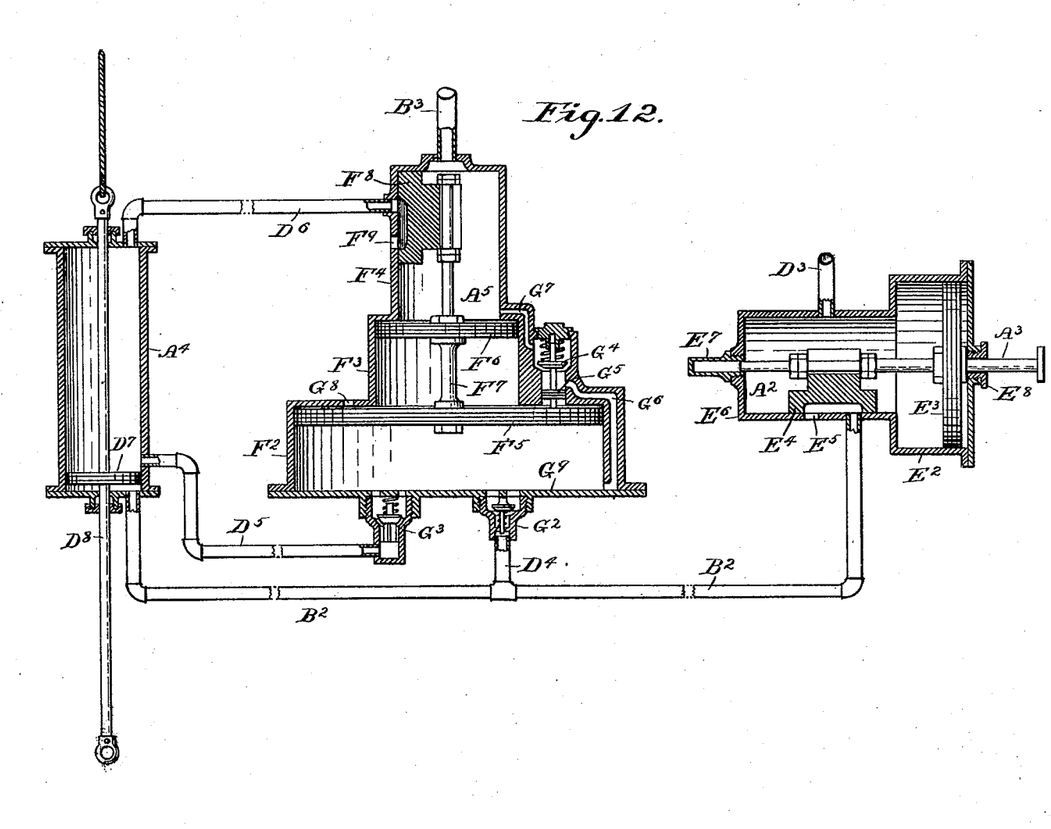
Fig. 12, central sectional views of details of the cylinder and valves in their relative operative positions by which the doors are controlled.

In practical use the operation of my invention is as follows: The reservoir $a$ being charged by air and a pressure maintained therein through its pipes communicating with a compressor or by steam from a boiler, and the primary valves P or $P^2$ being set so as to permit a continuous flow of fluid from the supply plant through each pipe $b'$ $d'$ and $b^2$ $d^2$, the chambers at each side of the piston in the main-valve controller X on the platform $r$ are charged, and an equal pressure is maintained therein and in the communicating pipes, and also the chest of the main valve V is charged from the reservoir $a$. The valves $A^2$ and $J^2$ are charged from the pipe $D^2$, and the valve $A^5$ is charged from the pipe $B^3$. In Fig. 12 the valves and pistons are normally in the positions shown, except that valves $G^2$ and $G^3$ should be seated. The house-doors would be closed. Fluid from the reservoir $a$ through the pipe $k$ enters the latch-applying valve $W^2$, forcing the piston 63 against the opposite end and opening port 68 to port 69, and also opening port to pipe $j$, passes into the latch-cylinder $u$, forcing the latch into a pocket 32, these being the normal positions when the table is at rest. The clutch-block $I^2$ is also in engagement. Now to move the turn-table a primary valve, as $P^2$ in Fig. 6, is set by moving its handle $c$ so as to cut off the fluid-supply flowing, as indicated by the arrows, between the valve and compressor in pipe $b^2$, but permitting a free passage in pipe $b'$. This opens communication to the atmosphere through exhaust-port 90 between the primary valve and the controller X, permitting a return flow, as at $b^5$, and escape of fluid, thus destroying the equilibrium in the chambers of the controlling-valve X to any desired extent. The excess pressure at the opposite side of the piston 71 causes it to move, and with it the valve $V'$, until a port is opened and fluid passes through the pipes $g$ or $h$, as designed, into the main motor T. Assuming that fluid has entered pipe $h$ and to the end $T^2$ of the motor, the piston $S^3$ is forced toward the opposite end, thus setting the train of gearing and the table in motion; but in its passage the fluid, as it reaches the first opening for escape, enters pipe $m$ and, unseating valve 56 in cylinder 41, passes through ports 59 and, meeting the greater area of piston 51, pushes it beyond and opens port 42, at the same time closing port 60 by piston 56, while the opposite pistons remain in the positions shown, normally closing the passages, except port 61. The fluid continues through pipe 13 to valve $w^2$, and meeting the larger piston 63 forces it against the reservoir-pressure toward the opposite end of its cylinder, cutting off the communication with ports 68 and 69 and opening communication between pipe $j$ and the atmosphere through the valve 64, and port 70 permits the escape of the fluid from the latch-cylinder $u$. Almost simultaneously the fluid passes through pipe $l$ into the auxiliary release-valve Q, forces the piston 45 forward, seats valve Q' to prevent leakage, and opens communication through pipe $l'$ with the forward end of the latch-cylinder $u$, which, acting upon its piston, withdraws the latch-bolt, permitting the table to move. These movements are accomplished almost instantly and before the pressure has had time to act upon the main motor. Should the table rotate to the limit of its designed travel when the piston $S^3$ has reached either end of the main-motor cylinder T, the cross-head at the end of the piston-rod will engage the nearest lever $e$, move the lever 3 and the valve 77 so as to open the port to pipe $q$, through which fluid enters cylinder $R^2$, forces its piston down, and disengages clutch-block $I^2$, permitting it and its shaft 89, with the wheel H, to run idly. The table may then be moved in the opposite direction, and as the cross-head moves away from the lever $e$ the fluid-pressure, acting upon the piston 76, causes the valve 77 to close the supply to pipe $q$ and permits the fluid in it and the cylinder $R^2$ to escape through port 79, resulting in the dropping of the clutch-block again into engagement. When it is desired to stop the motion of the table, the primary valve is set as at P, Fig. 6, restoring equilibrium in the pipes and valve-controller, so that piston 71, by means of the springs, returns to its central position, as does the valve V', retaining the fluid before used in the pipes and main motor, but without pressure. A further movement in the same direction requires only additional volume and pressure; but when a reverse movement of the table is desired the primary valve is moved in the opposite direction, and as the opposite port in the main valve V is opened the other is opened to the atmosphere, permitting the escape of the fluid used before. When the valve V' covers both ports to the main motor in the act of stopping the motion of the table, the pressure ceases and the spring 54 in the cylinder 41 forces the piston-valve 56 to its seat, piston 51 opening port 60 slightly in advance of the closing of port 42, allowing a quantity of fluid to escape from pipes $l$ and $l^3$, permitting the piston 45 to return to the position shown, so that the fluid is entirely and quickly exhausted from the latch-cylinder through valve-opening 46, while piston 63 also returns to the position shown and permits fluid from reservoir $a$ to enter the latch-cylinder and force the latch $w$ into its pocket. The latch pushes the rod $A^3$ inward against the pressure of fluid exerted against piston $E^3$, opening the port to pipe $B^2$, and the fluid passing therethrough enters cylinder $F^2$ through valve $G^2$ and forces piston $F^5$ up its full travel, so that it opens valve $G^4$, and the fluid also enters cylinder $A^4$, pushing piston $D^7$ up until it has passed the port to pipe $D^5$, into which fluid also enters as far as valve $G^3$, which would have been seated by the spring and fluid-pressure above it, valve $G^2$ being open. Piston $D^7$ travels the limit of its stroke, releasing the door-latches, opening the doors, and latching them against the latch-posts. The locomotive having passed through the doors, the table is moved away from its position, and as the latch $w$ is withdrawn the fluid-pressure in cylinder $E^2$ forces piston $E^3$ outward, permitting the fluid in pipes $B^2$ $D^5$ and cylinder $A^4$ to slowly escape through port $E^5$. As the fluid thus escapes, the valve $G^2$, being held open by the spring, permits the fluid to escape through it from cylinder $F^2$. This removal of the pressure under piston $F^5$ permits it to be forced down by the fluid-pressure above piston $F^6$, and the first slight movement allows valve $G^4$ to close, so that a full downward movement of piston $F^5$ and valve $F^8$ opens the port to pipe $D^6$, admitting fluid to the top of cylinder $A^4$, and pushing piston $D^7$ down causes the doors to unlatch, close, and again become latched. When piston $D^7$ has completed its stroke and has passed down below the port to pipe $D^5$, the full pressure of the fluid enters through it and valve $G^3$ suddenly into cylinder $F^2$, closing valve $G^2$ forces piston $F^5$ up, closing pipe $D^6$ opens exhaust $F^9$, and opening valve $G^4$ admits fluid through port $G^6$ to the lower side of piston $F^5$, thus holding it up, so that cylinder $A^4$ becomes free of pressure, and having an exhaust-opening at each side of piston $D^7$ it may freely move as the doors are operated manually, as may sometimes be desirable. A vent $G^8$ prevents compression between pistons $F^5$ and $F^6$.

The roller-trips $J^7$ may be made to yield and spring back as the one at the following side of the table passes over the slide $J^6$, so as to not affect it, while that on the approaching side of the table presses the slide and operates the valve $J^2$, causing a signal-blast of the whistle $J^3$ to notify the operator within the house when the end of the table approaches the desired track.

Having thus described my invention, what I claim as new, and desire to secure by Letters Patent, is—

1. An automatic turn-table adapted to be operated by fluid-pressure as a motive force and comprising a suitable table, a fluid-pressure main motor carried by said table, a main valve adapted to control the flow of fluid to and from said main motor, an automatic controller to operate said main valve, a supply-pipe connecting said main valve, a supporting-arch situated centrally above the table, a swivel-joint mounted centrally upon said arch and adapted to form multiple ducts therethrough for the passage of fluid, fluid-conveying pipes connecting said swivel-joint with said valve-controller, fluid-conveying pipes connecting said swivel-joint with a fluid-supply plant exterior to said table, primary valves connected with said fluid-conveying pipes and adapted to either permit a free passage through said fluid-conveying pipes or close either pipe and allow fluid to escape from the opposite pipe, said fluid-conveying pipes forming two separate and continuous ducts through said swivel-joint between a supply plant and said main-valve controller, a latch upon said table to secure it and means by which said latch may be operated by fluid-pressure automatically, and means by which said main motor may transmit motion to said table, substantially as shown and described.

2. An automatic turn-table adapted to be operated by fluid-pressure as a motive force and comprising the table suitably mounted, the arch thereon, a swivel-joint mounted centrally upon the arch and having a plurality of separate ducts therethrough for the passage of fluid under pressure, pipes leading therefrom to suitable points upon the table, pipes connecting said swivel-joint with a fluid-supplying plant exterior to said table, primary valves to control the flow and pressure of fluid in said pipes, a main motor mounted on said table and means by which it may impart motion thereto, a main fluid-controlling valve for said main motor and a fluid-pressure controller for said main valve adapted to be operated automatically by fluid-pressure when said primary valves are suitably manipulated, said primary valves and said main-valve controller being connected by suitable pipe-ducts, and means for latching and unlatching said table automatically as required in the operation of said table, substantially as shown and described.

3. An automatic turn-table adapted to be operated by fluid-pressure as a motive force and comprising the table suitably mounted, the main motor thereon, the rack anchored in the pit, the gearing connecting said main motor with said rack, the arch, the swivel-joint on the arch having fluid-ducts therethrough, the fluid-conveying pipes connected to said swivel-joint, the primary valves connecting said fluid-conveying pipes, the main valve for said main motor, the main-valve controller in communication with said fluid-conveying pipes, the latch-bolt mounted upon the table, the latch-cylinder having the piston therein and connected to said latch-bolt, a latch-applying valve having the supply-pipe and also the pipe communicating with the rear end of said latch-cylinder and adapted to permit a flow of fluid therethrough by which said latch-bolt is seated, means by which said flow of fluid may be cut off and the fluid exhausted from said latch-cylinder when fluid-pressure is applied to said main motor, a supply-pipe for said main valve, and a latch-release valve adapted to automatically admit fluid to the forward end of said latch-cylinder when fluid-pressure is applied to operate said main motor and release the same when the pressure applied to said main motor is reduced, substantially as shown and described.

4. The combination of the table, a main motor thereon adapted to use fluid-pressure and to transmit power whereby said table may be rotated, the arch on said table, a swivel-joint having substantially an upper stationary part provided with multiple fluid-ducts therethrough and a lower part fixed to said arch and provided with multiple chambers each communicating with a separate one of said ducts, the pipes connected to said swivel-joint, a main valve and supply-pipes for said main motor, a controller to operate said main valve and having two chambers therein divided by a packed piston adapted to be moved in either direction by fluid-pressure, said piston being operatively connected to said main valve so that they move in unison, a pipe forming a fluid-duct through said swivel-joint between one of said two chambers and a fluid-supply plant and a like pipe between the other of said chambers and said supply plant, valves connecting said two fluid-pipes whereby pressure in said two chambers may be caused to fluctuate so that the greater pressure on one side of said piston shall force it from its central position, means by which said piston may be held in a central position when the pressure is equal at each side thereof, and means by which power may be transmitted from said main motor to actuate said table, substantially as shown and described.

5. The combination of the turn-table, the main motor thereon comprising a horizontal cylinder having a fluid-port at each end, the piston therein secured at the longitudinal center of its rod, said rod working through each head of the cylinder, a cross-head secured at each end of said piston-rod, the supporting-guides for said cross-heads, the continuous cable or chain having its ends attached to said cross-heads, the wheel at each end of said turn-table over which said chain runs, the train of gearing connecting one of said wheels by which power is transmitted to actuate said table, the circular rack connected with said gearing, the clutch mechanism adapted to disengage said gearing, the clutch-cylinder, the safety-valve to operate said clutch-cylinder, the levers adapted to contact with said cross-head and operate said safety-valve, the reservoir and pipe leading therefrom to said safety-valve, with means by which said main motor may be operated by fluid-pressure and means by which said reservoir may be charged with a fluid-pressure, substantially as shown and described.

6. The combination of the turn-table, the main motor thereon comprising the horizontal cylinder having a fluid-port at each end and a piston working in the cylinder and attached to a rod passing through its packed heads, gearing connecting with said rod by which said table may be rotated, the circular rack connecting said gearing, the main valve and means by which it is controlled, the main port-pipes between said main valve and said horizontal cylinder, the latch-release valve in communication with said port-pipes and adapted to operate automatically when pressure is being admitted and released in either of said port-pipes, the latch-cylinder having a piston working therein, the latch-bar connecting with said latch-piston, the reservoir on said table, the auxiliary release-valve and pipes connecting it with the forward end of said latch-cylinder and said latch-release valve, the latch-applying valve having a pipe connecting with said reservoir and a pipe connecting with the rear of said latch-cylinder and having a duct therethrough permitting fluid to pass from said reservoir to said latch-cylinder whereby the latch is normally held in engagement, the pipe communicating between said latch-applying valve and said latch-release valve through which fluid may pass to automatically operate said latch-applying valve to exhaust the fluid from said latch-cylinder or admit it thereto, the central arch on said table, the swivel-joint on said arch, the pipes leading therefrom to a supply plant, and the pipes leading from said swivel-joint and suitably connected, substantially as shown and described.

7. In a turn-table, the combination with the main motor and gearing, of the port-pipes leading to said main motor, the main valve, the main-valve controller, means for operating said main-valve controller, the swivel-joint and fluid-pipes connected therewith, the latch-release valve in communication with said port-pipes, the auxiliary release-valve in communication with said release-valve, the latch-applying valve in communication with said latch-release valve, the reservoir in communication with said latch-applying valve, the latch-cylinder in communication with said applying-valve and also with said auxiliary valve, the latch-bar and the piston in said latch-cylinder connected thereto, said latch-release valve, said latch-applying valve and said auxiliary valve being adapted to act automatically as described to control said latch, substantially as set forth.

8. In a turn-table, the combination with a suitable central support or arch thereon, of a swivel-joint consisting of a lower portion fixed to said support and comprising a case divided into a plurality of detachable chambers the partitions of which are each provided with a packing-box and a central aperture therethrough, each of said chambers having an outlet-pipe connected therewith, and an upper portion substantially stationary comprising a case having a bearing-collar rotating upon ball-bearings upon the top of said lower portion, said upper case extending into the upper chamber of said lower case forming a duct thereto, and having at its lower end an annular packing between it and the side walls of said chamber and a head having a ball-bearing against the top of said chamber, a plurality of pipes forming separate ducts in said upper case extending downward into the several chambers below through the packing-boxes, each chamber being in communication with a separate duct, and an inlet-pipe communicating at the upper end with each of said ducts, substantially as shown and described.

9. The combination of the swivel-joint comprising the lower portion divided into a plurality of separate chambers the partitions of which are provided each with a central aperture and packing-box, the pipes connected to said chambers, the upper portion having the separate ducts therethrough and pipes connected at the upper end thereof, the pipes forming said ducts extending downward into said lower portion and terminating in said chambers, a separate pipe to each chamber and passing through said packings in which they may rotate, the bearings within and on top of said lower portion, the packed head at the lower end of the outer pipe of said upper portion, the magnetic rings around said lower portion and the wires connected thereto, the overhanging arm carried by said upper portion, the brushes carried by said arm and in contact with said rings and the wires connected thereto, substantially as shown and described.

10. In a turn-table, the combination with the latch-cylinder and the latch-release valve, of the auxiliary release-valve comprising a cylinder having at one end an aperture central in a head and a valve-seat at the inside of the head around the aperture, a valve adapted to said seat and to close said aperture, a stem attached at one end centrally to said valve, a piston attached to the opposite end of said stem, said piston and said valve being adapted to work a short distance in said cylinder, a cage around said valve-seat by which said valve is guided, a pipe connecting the opposite end of the cylinder with said latch-release valve, a spiral spring normally forcing said valve off its seat and said piston against the opposite end of the cylinder, a port in the side of the cylinder situated so as to be passed by said piston in either direction of its travel, and a pipe communicating between said side port and the forward end of said latch-cylinder, whereby said latch may be withdrawn by fluid-pressure from engagement, with means whereby said latch may be forced outward when the fluid is released from the said forward end, substantially as shown and described.

11. In a turn-table, the combination with the latch-cylinder, the latch-release valve, the auxiliary release-valve, and the reservoir, of the latch-applying valve, comprising a cylinder having a large and a smaller diameter, a large piston working in the larger portion thereof and having a stem extending into the smaller portion, a slide-valve in the smaller portion carried by said stem, said valve having an exhaust-cavity in its sliding surface, an exhaust-port covered by said cavity, a port arranged in the wall of the cylinder to be covered by said cavity and having a pipe communicating with the rear end of said latch-cylinder, a piston-valve in said smaller portion and carried by said stem, a port extending from the forward end of said piston-valve through its center and out at its side, a port in the wall of the smaller end of the cylinder adapted to be opened or closed to the port in said piston-valve and extending to the rear thereof and communicating with the cylinder-chamber, with the pipe communicating with said reservoir and the pipe communicating with said latch-release valve, substantially as shown and described.

12. An automatic turn-table and door-operating apparatus adapted to be operated by fluid-pressure as a motive force and comprising a suitable table, a fluid-pressure main motor carried by said table, a main valve adapted to control the flow of fluid to and from said main motor, an automatic controller to operate said main valve, a supply-pipe connecting said main valve, a supporting-arch situated centrally above the table, a swivel-joint mounted centrally upon said arch and adapted to form multiple ducts therethrough for the passage of fluid, fluid-conveying pipes connecting said swivel-joint with said valve-controller, fluid-conveying pipes connecting said swivel-joint with a fluid-supply plant exterior to said table, primary valves connected with said fluid-conveying pipes and adapted to either permit a free passage through said fluid-conveying pipes or close either pipe and allow fluid to escape from the opposite pipe, said fluid-conveying pipes forming two separate and continuous ducts through said swivel-joint between a supply plant and said main-valve controller, a latch upon said table to secure it and means by which said latch may be operated by fluid-pressure automatically, gearing by which said main motor may transmit motion to said table, a door-opening valve at the bulkhead adapted to be opened by contact of said latch, a supply-pipe for said door-opening valve, a door-operating cylinder having its lower end in communication by a pipe with said door-opening valve, a door-closing valve having its lower end in communication with the said pipe between said door-opening valve and said door-operating cylinder and also a pipe communication with the said lower end of said door-operating cylinder, a pipe communicating between the upper end of said door-operating cylinder and the upper end of said door-closing valve, a piston in said door-operating cylinder and having a rod extending through both heads thereof, a cable attached to each end of said piston-rod and each suitably guided and divided and connected to the doors of a roundhouse adjacently situated, and a supply-pipe for said door-closing valve, whereby said table and said house-doors may be operated automatically, substantially as shown and described.

13. An automatic turn-table adapted to be operated by fluid-pressure as a motive force and comprising the table suitably mounted, the main motor thereon, the rack anchored in the pit, the gearing connecting said main motor with said rack, the arch, the swivel-joint on the arch having fluid-ducts therethrough, the fluid-conveying pipes connected to said swivel-joint, the primary valves connecting said fluid-conveying pipes, the main valve for said main motor, the main-valve controller in communication with said fluid-conveying pipes, the latch-bolt mounted upon the table, the latch-cylinder having the piston therein and connected to said latch-bolt, a latch-applying valve having the supply-pipe and also the pipe communicating with the rear end of said latch-cylinder and adapted to permit a flow of fluid therethrough by which said latch-bolt is seated, means by which said flow of fluid may be cut off and the fluid exhausted from said latch-cylinder when fluid-pressure is applied to said main motor, a supply-pipe for said main valve, and a latch-release valve adapted to automatically admit fluid to the forward end of said latch-cylinder when fluid-pressure is applied to operate said main motor and release the same when the pressure applied to said main motor is reduced, a door-operating apparatus comprising a cylinder having a piston and a piston-rod, the latter extending through each head of its cylinder, cables connected to said rod and to the house-doors and so arranged that the movement of said piston in one direction shall open said doors and a movement in the opposite direction shall close said doors, a valve in the bulkhead adapted to be operated by the pressure of said latch-bolt when entering its pocket and to admit fluid into said door-cylinder to open said doors, and a valve adapted to automatically admit fluid into the opposite end of said door-cylinder to close said doors, said door opening and closing valves being adapted to also release the fluid in said door-cylinder, substantially as shown and described.

14. The combination of the turn-table, the main motor thereon comprising the horizontal cylinder having a fluid-port at each end and a piston working in the cylinder and attached to a rod passing through its packed heads, gearing connecting with said rod by which said table may be rotated, the circular rack connecting said gearing, the main valve and means by which it is controlled, the main port-pipes between said main valve and said horizontal cylinder, the latch-release valve in communication with said port-pipes and adapted to operate automatically when pressure is being admitted and released in either of said port-pipes, the latch-cylinder having a piston working therein, the latch-bar connecting with said latch-piston, the reservoir on said table, the auxiliary release-valve and pipes connecting it with the forward end of said latch-cylinder and said latch-release valve, the latch-applying valve having a pipe connecting with said reservoir and a pipe connecting with the rear of said latch-cylinder and having a duct therethrough permitting fluid to pass from said reservoir to said latch-cylinder whereby the latch is normally held in engagement, the pipe communicating between said latch-applying valve and said latch-release valve through which fluid may pass to automatically operate said latch-applying valve to exhaust the fluid from said latch-cylinder or admit it thereto, the central arch on said table, the swivel-joint on said arch, the pipes leading therefrom to a supply plant, the pipes leading from said swivel-joint and suitably connected, the door-controlling cylinder and the piston and rod working therein, the cables connecting said rod with the adjacent house-doors, the valve adapted to admit fluid to said door-cylinder to close said doors, the valve adapted to admit fluid to said door-cylinder to open said doors and to be opened by contact with said latch-bar, the signal-whistle and a valve therefor adapted to be operated by contact of said table, substantially as shown and described.

15. In a turn-table, the combination with the main motor and gearing, of the port-pipes leading to said main motor, the main valve, the main-valve controller, means for operating said main-valve controller, the swivel-joint and fluid-pipes connected therewith, the latch-release valve in communication with said port-pipes, the auxiliary release-valve in communication with said release-valve, the latch-applying valve in communication with said latch-release valve, the reservoir in communication with said latch-applying valve, the latch-cylinder in communication with said applying-valve and also with said auxiliary valve, the latch-bar and the piston in said latch-cylinder connected thereto, said latch-release valve, said latch-applying valve and said auxiliary valve being adapted to act automatically as described to control said latch, the door-opening valve adapted to be opened by said latch-bar when entering its pocket, the door-controlling cylinder and piston and rod therein, the door-closing valve the communicating pipes between said door-opening valve and said door-closing valve and said door-controlling cylinder, and the cables connecting the said piston-rod by which the doors of an adjacent roundhouse may be opened and closed, substantially as shown and described.

16. In a turn-table, adapted to be operated by fluid-pressure, the combination with a surrounding bulkhead having suitable latch-pockets, of the latch suitably mounted at the end of said turn-table, the latch-cylinder suitably supported at the rear of said latch, the piston working in said cylinder, the rod connecting said piston and said latch, the connecting-pipe at each end of said cylinder, with means by which fluid-pressure may be controlled to enter to or return from said cylinder to operate said piston and said latch, an aperture in the bottom of each of said latch-pockets, a door-opening valve in said bulkhead having its valve-rod extending through said aperture, said door-opening valve having a fluid-supply pipe and adapted to admit fluid to a suitable door-controlling cylinder, a door-closing valve in communication with said door-opening valve, a cylinder in communication with said door-opening valve and said door-closing valve, a piston in said door-controlling cylinder and having a rod connecting cables whereby the doors of an adjacent house may be operated, and latches on said doors adapted to be lifted by said cables, substantially as shown and described.

In testimony whereof I affix my signature in presence of two witnesses.

JOHN H. HARTING.

Witnesses:
WM. H. PAYNE,
E. T. SILVIUS.